(12) United States Patent  
Lee (10) Patent No.: US 7,552,263 B2
(45) Date of Patent: Jun. 23, 2009

(54) PORTABLE COMPUTER AND METHOD OF CONTROLLING THE SAME

(75) Inventor: Joo Cheol Lee, Suwon-si (KR)

(73) Assignee: LG Electronics Inc., Seoul (KR)

( * ) Notice: Subject to any disclaimer, the term of this patent is extended or adjusted under 35 U.S.C. 154(b) by 136 days.

(21) Appl. No.: 11/261,625

(22) Filed: Oct. 31, 2005

(65) Prior Publication Data

US 2006/0253637 A1 Nov. 9, 2006

(30) Foreign Application Priority Data

May 9, 2005 (KR) .................. 10-2005-0038413

(51) Int. Cl.
G06F 13/00 (2006.01)
H05K 7/10 (2006.01)

(52) U.S. Cl. ...................... 710/302; 710/300

(58) Field of Classification Search .................. 710/303
See application file for complete search history.

(56) References Cited

U.S. PATENT DOCUMENTS

| | | | | |
|---|---|---|---|---|
| 5,781,744 | A * | 7/1998 | Johnson et al. | 710/304 |
| 5,822,547 | A * | 10/1998 | Boesch et al. | 710/302 |
| 5,920,709 | A * | 7/1999 | Hartung et al. | 710/305 |
| 5,933,609 | A * | 8/1999 | Walker et al. | 710/304 |
| 6,460,099 | B1 * | 10/2002 | Stryker et al. | 710/74 |
| 6,654,842 | B1 * | 11/2003 | Park | 710/302 |
| 6,718,416 | B1 * | 4/2004 | Self et al. | 710/302 |
| 6,779,068 | B2 * | 8/2004 | Kim | 710/303 |
| 6,845,420 | B2 * | 1/2005 | Resnick | 710/303 |
| 6,963,939 | B2 * | 11/2005 | Stryker et al. | 710/104 |
| 6,963,943 | B2 * | 11/2005 | Wakely et al. | 710/302 |
| 7,159,063 | B2 * | 1/2007 | Sivertsen | 710/306 |
| 7,389,366 | B2 * | 6/2008 | Core | 710/22 |
| 2002/0188792 | A1 * | 12/2002 | Stryker et al. | 710/305 |
| 2003/0046470 | A1 * | 3/2003 | Sivertsen | 710/304 |
| 2004/0057182 | A1 * | 3/2004 | Yuan | 361/100 |

FOREIGN PATENT DOCUMENTS

| | | | |
|---|---|---|---|
| EP | 810531 A1 | * | 12/1997 |
| KR | 1020040094992 A | * | 12/2004 |
| TW | 220978 | | 9/2004 |
| TW | 221971 | | 10/2004 |

OTHER PUBLICATIONS

Finch, Stephen G; "Information Technology—AT Attachment Interface with Extensions (ATA-2)"; X3T10 Technical Committee; Revision 4c; Mar. 18, 1996; all pages.*
Translation of Taiwanese Office Action dated Dec. 24, 2008.

* cited by examiner

*Primary Examiner*—Paul R Myers
*Assistant Examiner*—Ryan M Stiglic
(74) *Attorney, Agent, or Firm*—KED & Associates, LLP (57) ABSTRACT

Embodiments of a method and apparatus for controlling a personal computer are provided that can stably engage and disengage a bay device to a single IDE channel coupled to a main memory. An embodiment of a portable computer can include an integrated drive electronic (IDE) controller supporting a single IDE channel, a main memory and a bay device connected to the IDE channel, and a control device that can set the IDE channel in a tri-state and reset (e.g., restore) the connection to the IDE channel as the bay device is attached to and detached from a bay.

19 Claims, 8 Drawing Sheets

FIG. 1

(RELATED ART)

FIG.2

(RELATED ART)

FIG 3

(RELATED ART)

```
[Embodiment of operations performed by SMI handler]
; setMediabayChange - BaySwap support on NAPA_VC
;
; Entry:
;    None
;
; Exit:
;
; Modifies:
;    All registers should be preserved.
;
; Processing:
;
setMediabayChange PROC NEAR PUBLIC
 pushad ;
; debugging Code
;
 mov al, 26h
 out 80h, al ; Save HDD DMA Mode before IDE Reset# // The current operation mode
;                                     // of HDD is saved
;
 THUNKCALL    SaveCurrentDMAMode
;
; GPIO 39 - IDE & ODD Reset # // Reset HDD and bay device
;                             // connected to GPIO
;
   mov    dx, OEM_GPIO_DEFAULT_IO+38h
 in al, dx
 and al, NOT 0C0h
 out dx, al THUNKCALL    pmCoreMilliWaitlFar mov    dx, OEM_GPIO_DEFAULT_IO+38h
 in al, dx
 or al, 0C0h
 out dx, al
```

FIG. 5B

```
;
; // Master Device recognizes presence of slave device within 30
; // seconds after resetting HDD and bay device. Wait for presence
    of device to be recognized for 30 seconds.
;
 call wait_ATAPI_device
;
; Restore HDD Status
; // Recover previously stored operation mode of HDD after slave
; // device is recognized.
 THUNKCALL    RestoreCurrentDMAMode ;
; // Slight delay
;
  mov al, 150    ; 150 ms wait
  THUNKCALL    pmCoreMilliWaitlFar ;
; debugging Code
;
 mov al, 33h
 out 80h, al popad
 ret
setMediabayChange ENDP
```

FIG. 6A

```
[Part of embodiment of BIOS code performed by O/S]
; // Routine performed when there is change in state of bay
;
Method( QUERY_METHOD_BAYSTSCHANGE ) {      // Set MediaBay Status Change
  Store(1,W_SB.PCI0.PATA.ICR4) // Set Tri-Status
  And(0xFFDD,W_SB.PCI0.PATA.PRIT, W_SB.PCI0.PATA.PRIT) // IORDY
                                                       // clear
        P8XH( 0, 0x49 )            // debug Code

Acquire( MUEC, 0xffff )
  Store(BAYS, Local0 ) // Get the current Bay Status from ECRAM
  Release(MUEC)

if(LEQUAL(0, Local0)) // If no auxiliary memory is attached to bay
  {
// And(0xE, W_SB.PCI0.PATA.SYNC, W_SB.PCI0.PATA.SYNC)
    Store(26, SMIF)    // Call setMediaBayChange (System
                                      // BIOS SMI handler)
    Store(0, TRP0)
    Or(W_SB.PCI0.PATA.PRIT, 0x22, W_SB.PCI0.PATA.PRIT) // IORDY
                                                       // set
// Or(W_SB.PCI0.PATA.SYNC, 1, W_SB.PCI0.PATA.SYNC)
    Store(0,W_SB.PCI0.PATA.ICR4) // Set Normal-Status
    Sleep(100)
    Notify(W_SB.PCI0.PATA.PRID.P_D1, 1) // Inform O/S
                                        // that primary IDE disappears
                                        // or appears
    Notify(W_SB.PCI0, 1)  // Inform O/S that PCI device disappears
                                        // or appears
  }
   else             // If auxiliary memory is attached to bay
  {
    And(0xC, W_SB.PCI0.PATA.SYNC, W_SB.PCI0.PATA.SYNC)
    Store(26, SMIF)   // Call setMediaBayChange
                                        // (System BIOS SMI handler)
    Store(0, TRP0)
    Or(W_SB.PCI0.PATA.PRIT, 0x22, W_SB.PCI0.PATA.PRIT) // IORDY
                                                       // set
    Or(W_SB.PCI0.PATA.SYNC, 3, W_SB.PCI0.PATA.SYNC)
    Store(0,W_SB.PCI0.PATA.ICR4) // Set Normal-Status
    Sleep(100)
    Notify(W_SB.PCI0.PATA.PRID.P_D1, 0)    // Instruct O/S to look for
                                           // primary IDE through Pnp
                                           // enumeration
    Notify(W_SB.PCI0, 0)      // Instruct O/S to look for
                                           // PCI divice through Pnp
                                           // enumeration
   }
 }
```

FIG. 6B

```
;
; // Routine performed when switch is pressed
;
Method( QUERY_METHOD_BAYREMOVEREQ ) {      // Bay Remove Requested!
    P8XH( 0, 0x4A )                        // debug Code
    Sleep(0x100)                           // delay routine
    Notify(W_SB.PCI0.PATA.PRID.P_D1, 3) // Inform Eject Request - OSPM
                           // that bay device will be ejected
                           // It is necessary for O/S to perform pnp ejection
//  Store(1, W_SB.PCI0.PATA.ICR4) // Set Tri-Status State
//  And(0xFFFC,W_SB.PCI0.PATA.PRIT, W_SB.PCI0.PATA.PRIT) // IORDY clear
}
```

PORTABLE COMPUTER AND METHOD OF CONTROLLING THE SAME

BACKGROUND OF THE INVENTION

1. Field of the Invention

The present invention relates to a portable computer and a method of controlling the same.

2. Background of the Related Art

Figure 1:
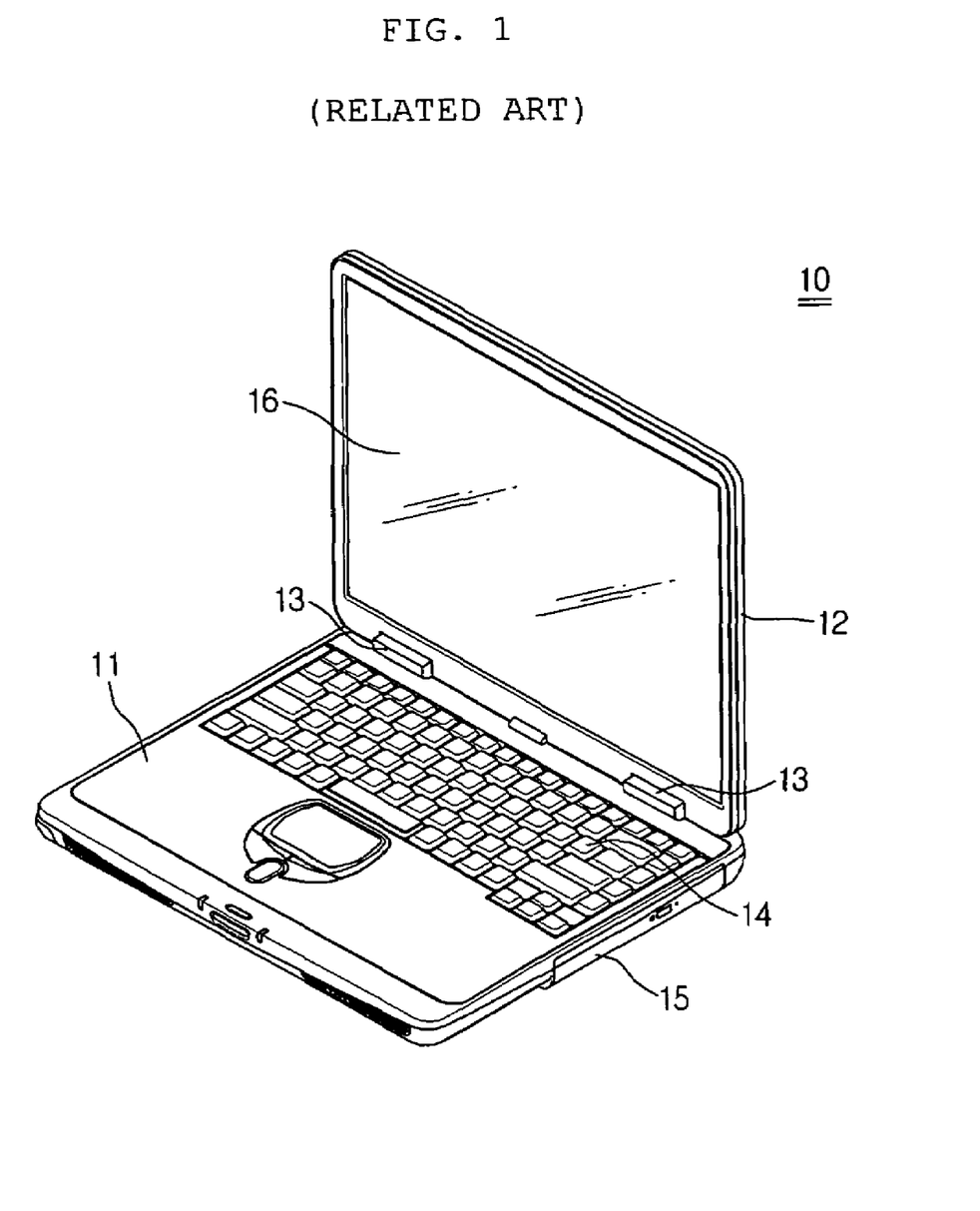
FIG. 1 is a diagram that illustrates a related art portable computer.

In general, portable computers are smaller and lighter than desktop computers to easily carry the portable computers. FIG. 1 illustrates a related art portable computer.

A related art portable computer 10 includes a main body unit 11 and a display unit 12. The main body unit 11 and the display unit 12 are hinged on each other by a hinge unit 13 so that the display unit 12 can be opened or closed with respect to the main body unit 11.

Various parts such as a main substrate and a hard disk drive are provided in a space formed in the main body unit 11. A keyboard 14 that is an input device is provided on top of the main body unit 11 and a plurality of keys are arranged in rows and columns in the keyboard 14. A bay 15 into which and from which a bay device (such as a CD-ROM drive and a DVD-ROM drive) is attached and detached is formed on the side of the main body unit 11.

A display module 16 is included in the display unit 12. The display module 16 is generally formed of a liquid crystal panel. A signal connection between the main body unit 11 and the display unit 12 is performed by signal connection lines in the hinge unit 13.

Figure 2:
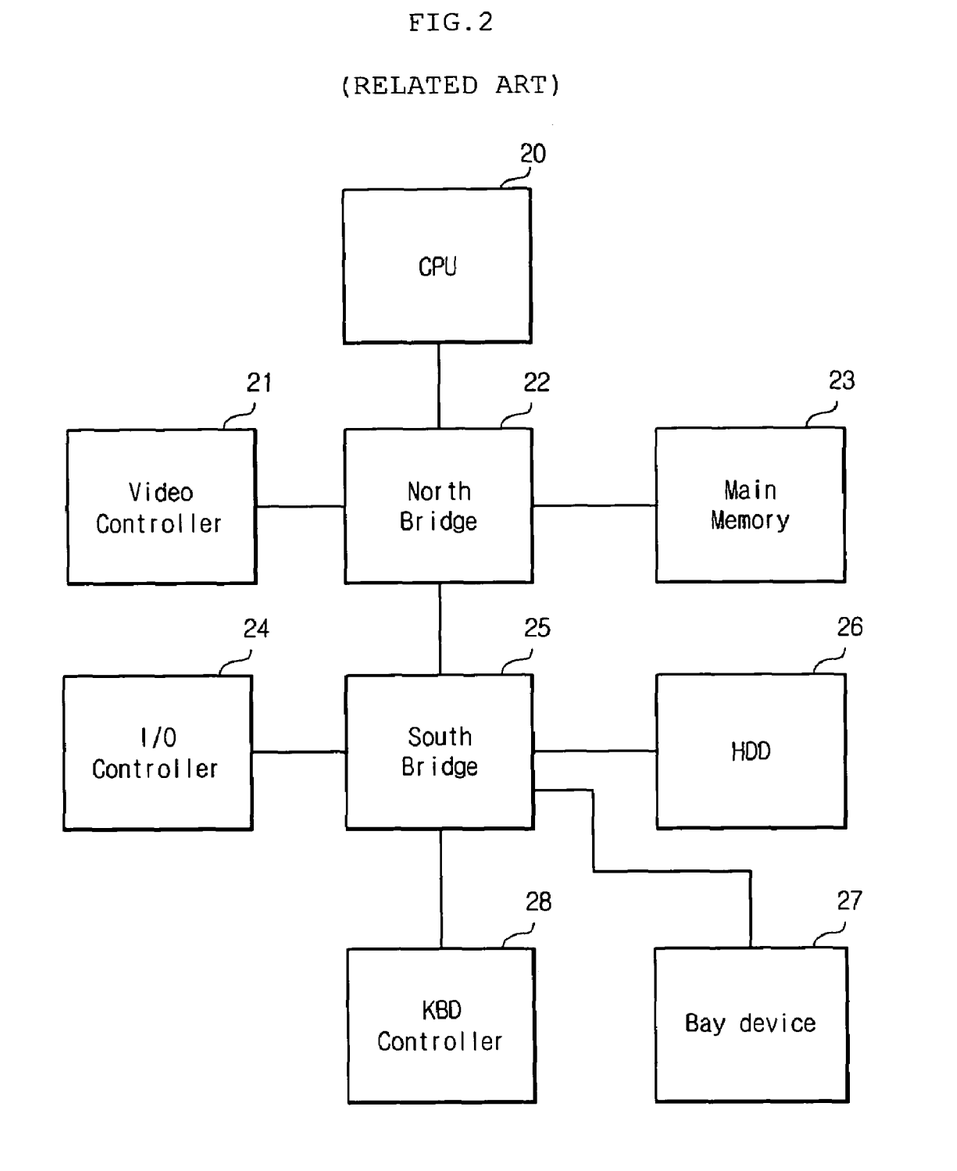
FIG. 2 is a diagram that illustrates the structure of the main body unit of the related art portable computer.

FIG. 2 illustrates the structure of the main body unit of the related art portable computer. As illustrated in FIG. 2, the main body unit of the portable computer includes a central processing unit (CPU) 20, a video controller 21, a north bridge 22, a main memory 23, an input and output (I/O) controller 24, a south bridge 25, a hard disk drive (HDD) 26, a bay device 27, and a keyboard (KBD) controller 28.

In the related art portable computer, the HDD 26 and the bay device 27 are connected to the south bridge 25. The bay device 27 is attached to and detached from the bay 15.

In the related art portable computer, like in a desktop computer, the HDD 26 and the bay device 27 are connected to the south bridge 25 using an integrated drive electronic (IDE) interface method. In the IDE interface method, two channels, that is, a primary channel and a secondary channel are provided.

Figure 3:
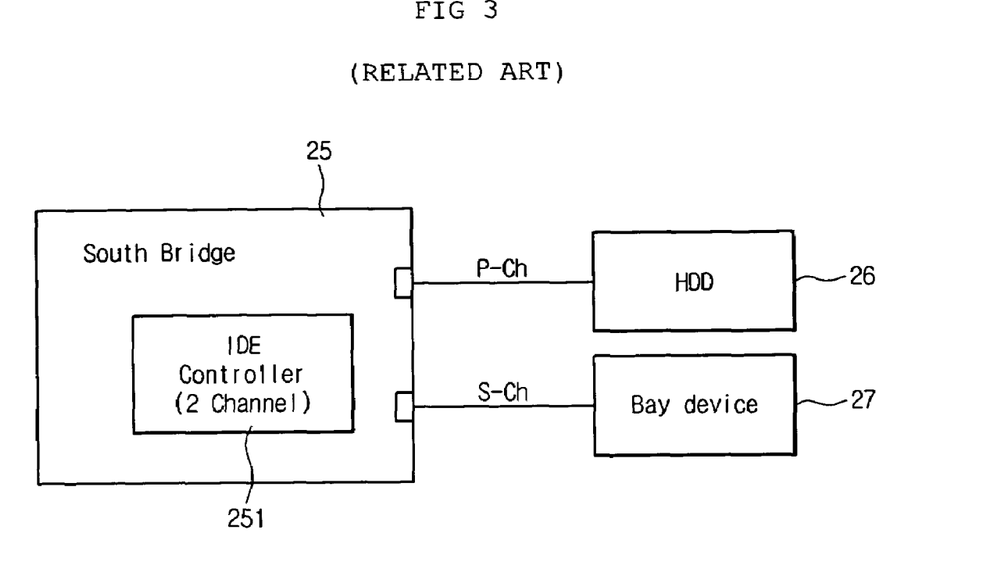
FIG. 3 is a diagram that illustrates that a hard disk drive (HDD) and an auxiliary memory are connected to each other through two integrated drive electronic (IDE) channels.

FIG. 3 illustrates that the HDD 26 and the bay device 27 are connected to each other through two IDE channels. The two IDE channels are comprised of the primary channel P-Ch and the secondary channel S-Ch.

The IDE controller 251 of the south bridge 25 is connected to the HDD 26 that is a main memory device after the primary channel is set as a master. The IDE controller 251 is connected to the bay device 27 such as the CD-ROM drive and the DVD-ROM drive after the secondary channel is set as a master.

As illustrated in FIG. 1, the bay device 27 is attached to and detached from the bay 15 and can be swapped so that various bay devices 27 are attached to and detached from the bay 15. The bay 15 in which the bay device 27 that can be swapped is attached is referred to as a swap bay and the bay device 27 using the swap bay is referred to as a swap bay device.

The bay device 27 must be set as the master so that the bay device 27 can be swapped. In this way, the related art portable computer in which the bay device 27 can be swapped supports the two IDE channels.

As described above, the related art portable computer and method of controlling the same have various disadvantages. For example, developers of chip sets for the portable computers strive for improved performance and effective power consumption. However, in the case of a system that supports only the primary channel, the bay device cannot be swapped.

The above references are incorporated by reference herein where appropriate for appropriate teachings of additional or alternative details, features and/or technical background.

SUMMARY OF THE INVENTION

An object of the invention is to solve at least the above problems and/or disadvantages or to provide at least the advantages described hereinafter.

Another object of the present invention is to provide a portable computer and method of controlling same that can solve at least the problems or disadvantages of the related art or to provide at least the advantages described hereinafter.

Another object of the present invention to provide a portable computer that is capable of supporting a single integrated drive electronic (IDE) channel in which a bay device can be swapped and a method of controlling the same.

In order to achieve at least the above objects and described herein described advantages in a whole or in part, in accordance with one aspect of the invention there is provided a portable computer that includes a channel controller configured to support a single channel, a main storage device and a bay device connected to the channel and a controller configured to set the channel in a tri-state and reset connection to the channel as the bay device is attached to or detached from a bay.

To further achieve at least the above objects and described herein described advantages in a whole or in part, in accordance with one aspect of the invention there is provided a method of controlling a portable computer in which a main storage device and a bay device are connected to a single IDE channel that includes sensing that the bay device is attached to the IDE channel, setting the IDE channel in a tri-state and resetting connection of the main storage device and the bay device to the IDE channel.

To further achieve at least the above objects and described herein described advantages in a whole or in part, in accordance with one aspect of the invention there is provided a method of controlling a portable computer including a primary device and a bay device connected to a single channel that includes setting the channel in a tri-state, resetting connection to the channel after an operation mode of the primary device is stored and retrieving the operation mode of the primary device after connection to the channel is reset.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIGS. 6A and 6B illustrate an embodiment of a BIOS code performed by an operating system (O/S) in accordance with the request of a microcomputer according to the present invention.

DETAILED DESCRIPTION OF PREFERRED EMBODIMENTS

Figure 4:
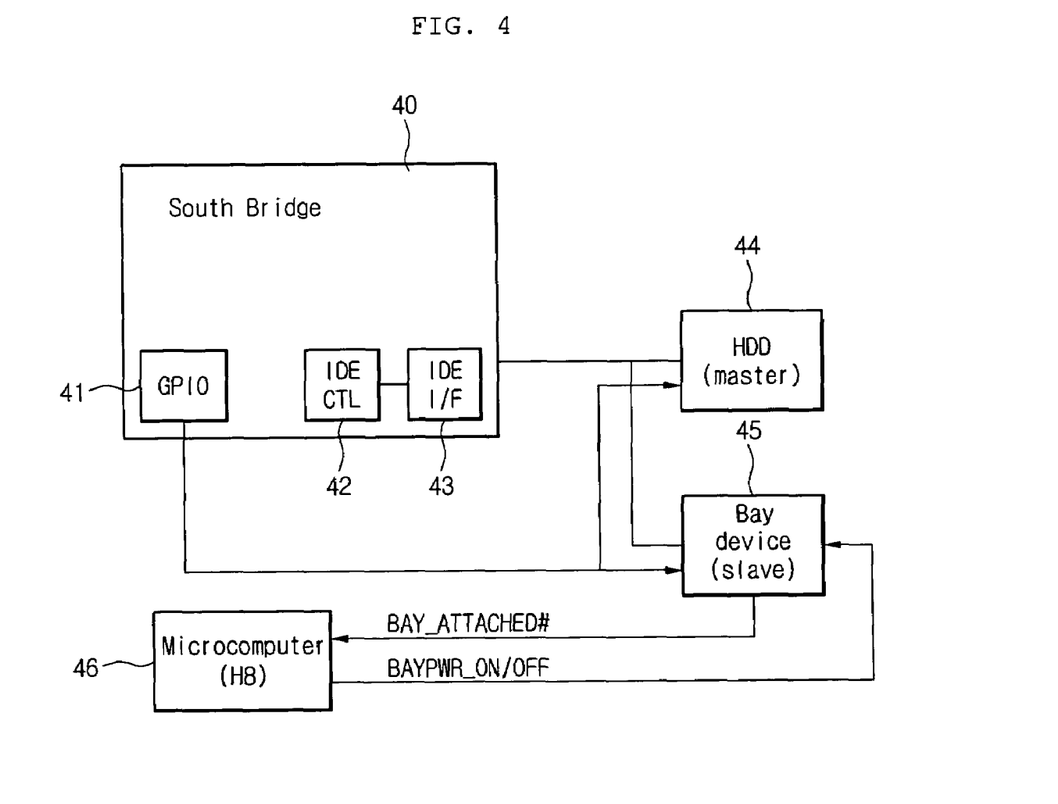
FIG. 4 is a diagram that illustrates an embodiment of a portable computer according to the present invention.

FIG. 4 is a diagram that illustrates an embodiment of a portable computer according to the invention. The portable computer include a south bridge 40 that supports a single integrated drive electronic (IDE) channel, a hard disk drive (HDD) 44 as a main memory, a bay device 45 that can be attached to and detached from a bay, and a microcomputer 46 that can operate as a controller.

As shown in FIG. 4, the south bridge 40 can include an IDE controller 42 that supports one IDE channel through an IDE interface unit 43 and a general purpose input/output pin (GPIO) 41. The GPIO 41 can be used for resetting the HDD 44 and the bay device 45.

The HDD 44 is coupled to the IDE interface unit 43 and can operate as a master. The bay device 45 is coupled to the IDE interface unit 43 and can operate as a slave. The bay device 45 is attached to a swap bay into which and from which various swap bay devices such as a CD-ROM drive, a DVD-ROM drive, a digital multimedia broadcasting (DMB) module, a portable Internet module, a digital TV module and the like can be attached and detached.

The microcomputer 46 can perform a controlling operation as the bay device 45 is attached to and detached from the bay. The microcomputer 46 may have the function of a keyboard controller.

Also, a flash ROM that can store a BIOS program, various application programs, and an operating system (O/S) can be included in the main board of the portable computer.

When the bay device 45 is attached to the bay in a state where power is applied to the portable computer, an indication such as a BAY-ATTACHED# signal can indicate to the microcomputer 46 that the bay device 45 is connected. For example, the BAY-ATTACHED# can be a low level so that the microcomputer 46 can sense that the bay device 45 is attached to the bay.

The microcomputer 46 that senses the BAY_ATTACHED# signal can apply power to the bay device 45 (e.g., BAYPWR_ON) and instruct the O/S to execute a _Q49 event handler. The _Q49 event handler can perform the following operations.

First, the _Q49 event handler can set the IDE controller 42 in a tri-state, clear a signal IORDY#, and check whether the bay device 45 is attached to the bay. For example, the tri-state can be a third floating state that is neither an on state nor an off state, and 0V can be referred to as an off state and no less than 3V can be referred to as an on state. The tri-state preferably means an electrically open state in which nothing is connected or coupled to the IDE controller 42. When the IDE controller 42 is in the on or off state and the bay device 45 is changed with portable computer power on, the IDE controller 42 can mis-operate. Therefore, it is important that the IDE controller 42 can be maintained in the tri-state.

Second, the _Q49 event handler can execute an SMI handler. The SMI handler can store the operation mode of the HDD 44 that is the master of a primary channel, reset (e.g., reset#) the HDD 44 and the bay device 45 so that the HDD 44 can determine or know that there is a change in a slave state, and recover the operation mode of the HDD 44.

Third, the _Q49 event handler can instruct the O/S to check the bay device 45 attached to the bay.

Figure 5A:
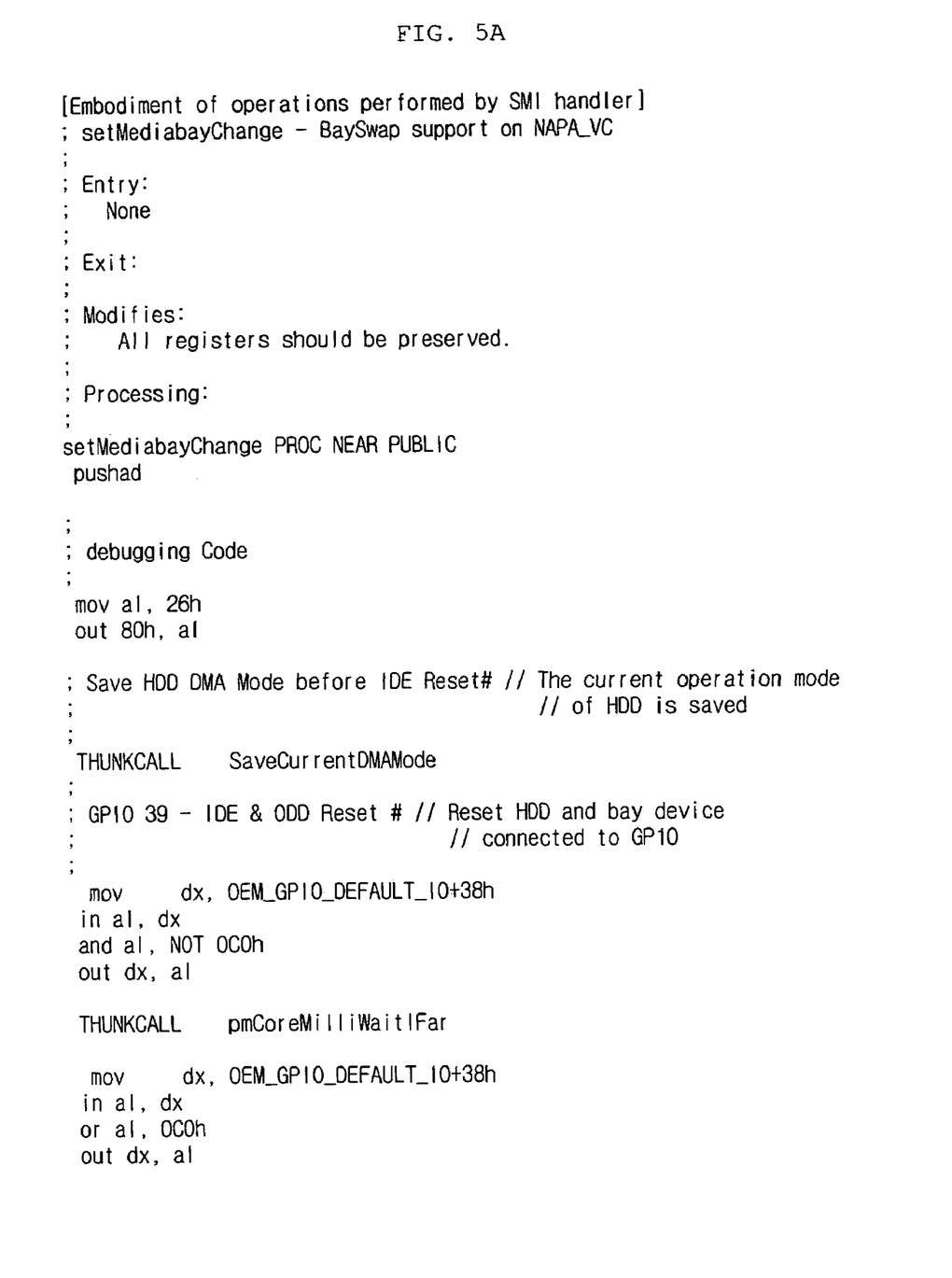
FIGS. 5A and 5B illustrate an embodiment of operations performed by an SMI handler according to the present invention.
Figure 5B:
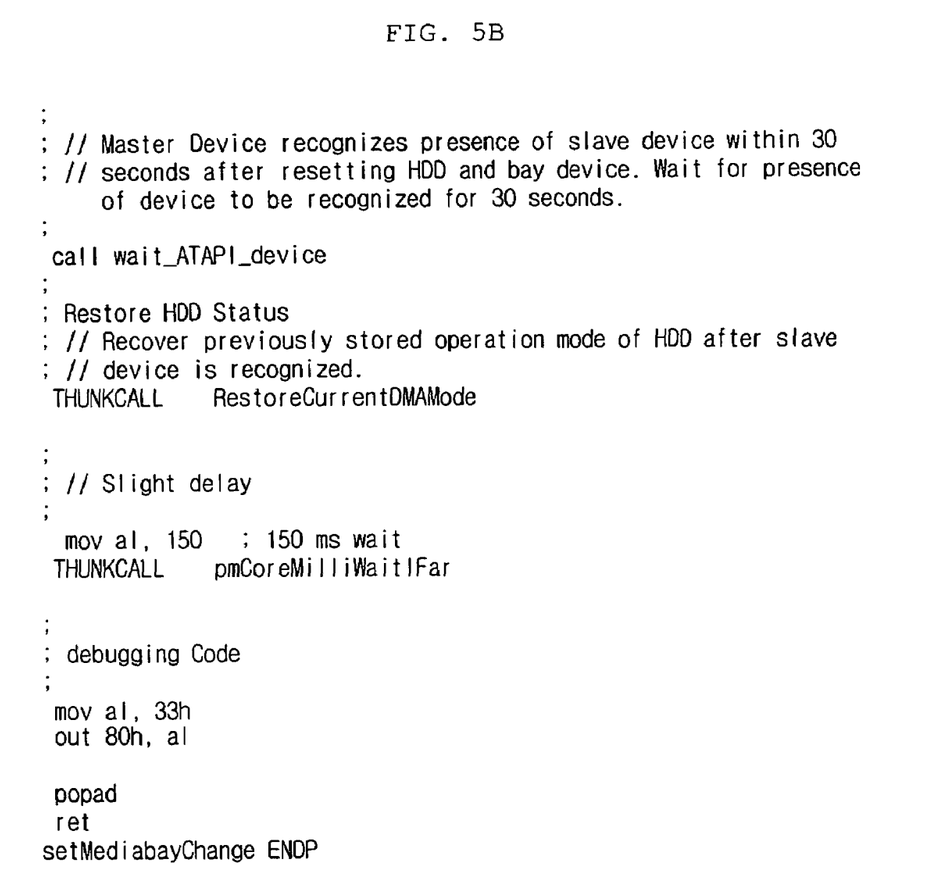

FIGS. 5A and 5B illustrate program codes and comments according to an embodiment of the operations performed by the SMI handler. In FIGS. 5A and 5B, the comments provide descriptions of contents and corresponding program codes. FIG. 5A specifically shows that a current operation mode (such as a Direct Memory Access (DMA) mode) may be saved. FIG. 5B also specifically shows that a master device may recognize a presence of a slave device within 30 seconds after resetting the HDD and a bay device. The previously stored operation mode of the HDD may be recovered after the slave device is recognized.

When a designated switch is pressed in order to detach the bay device 45 from the bay in the state where power is applied to the portable computer, the microcomputer 46 can generate a signal (e.g., BAY_DETACH_REQ#) and instruct the O/S to execute the _Q4A event handler. For example, the designated switch can be near the bay device 45 and preferably serves as a locking switch so that the bay device 45 can be firmly attached to the bay.

In BIOS ASL code_Q4A, the microcomputer 46 can inform the O/S that the bay device 45 will be detached from the bay (e.g., by plug and play). Therefore, the bay device can be safely detached from the bay.

Next, when the bay device 45 is detached from the bay, the signal BAY_ATTACHED# can be in a high state as hardware and the microcomputer 46 can turn off the power of the bay (e.g., BAYPWR_OFF) and instruct the O/S to execute the _Q49 event handler. The _Q49 event handler can perform the following operations.

First, the _Q49 event handler can set the IDE controller 42 in the tri-state, clear the signal IORDY#, and check whether the bay device 45 is attached to the bay.

Second, the _Q49 event handler can execute the SMI handler. The SMI handler can store the operation mode of the HDD 44 that is the master of the primary channel, reset (e.g., reset#) the HDD 44 and the bay device 45 so that the HDD 44 knows that there is a change in the slave state, and recover the operation mode of the HDD 44.

Third, the _Q49 event handler can instruct the O/S to check the bay device 45 attached to the bay.

Figure 6B:
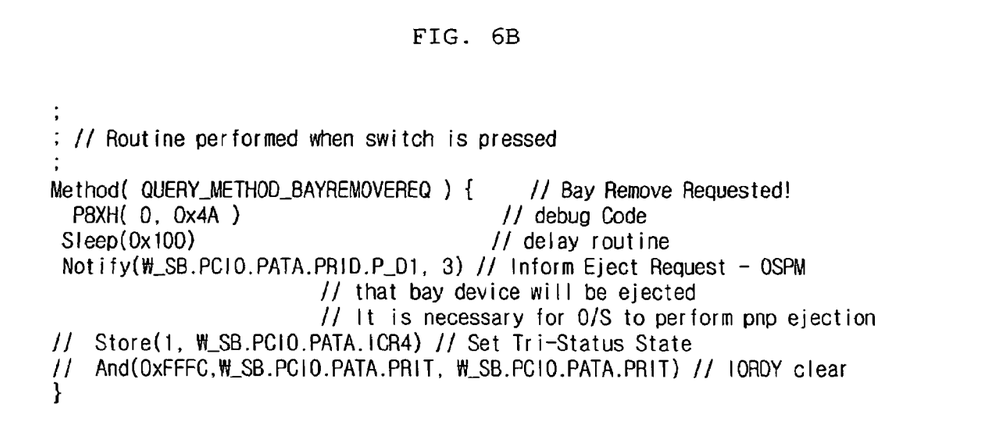

FIGS. 6A and 6B illustrate a part of an embodiment of the BIOS code executed by the O/S in accordance with the request of the microcomputer 46. In FIGS. 6A and 6B, the comments provide descriptions of contents of the corresponding BIOS code.

Figure 7:
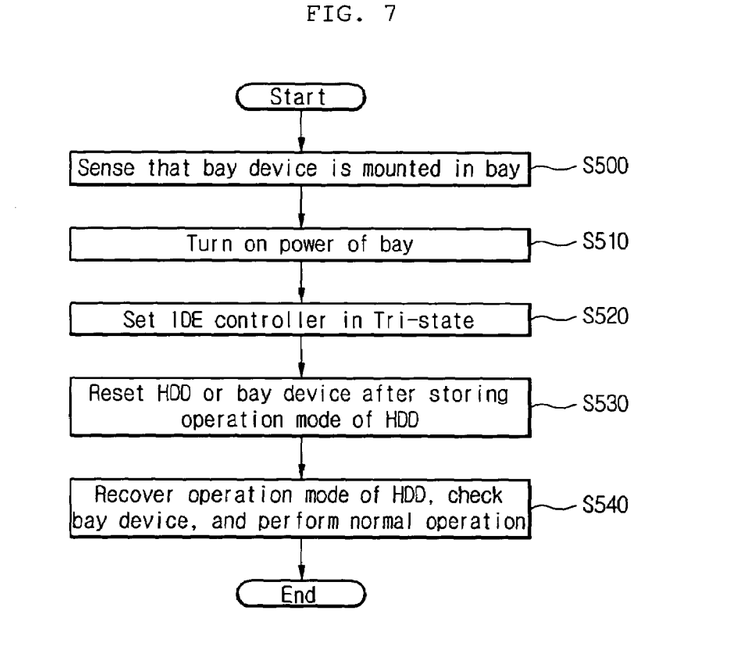
FIG. 7 is a flowchart illustrating an embodiment of a method of controlling the portable computer according to the present invention, which illustrates the case in which the auxiliary memory is attached to a bay.

FIG. 7 is a flowchart illustrating an embodiment of a method of controlling (e.g., attaching a bay device) the portable computer according to the invention. The method of FIG. 7 can be applied to and will be described using the embodiment of portable computer shown in FIG. 4. However, the invention is not intended to be so limited.

As shown in FIG. 7, when the bay device is attached to the bay, the signal BAY_ATTACHED# is in a low state (e.g., prescribed state) so that the microcomputer 46 can sense that the bay device 45 is attached to the bay (block S500). When the bay device 45 is attached to the bay, the microcomputer 46 can apply power to the bay (block S510). On the other hand, the O/S can set the IDE controller in the tri-state (block S520).

Then, the O/S can reset the HDD 44 and the bay device 45 after storing the operation mode of the HDD 44, recover the operation mode of the HDD 44, and check the bay device 45. After checking the bay device 45, the O/S normally operates in accordance with the newly attached bay device 45 (blocks S530 and S540).

Figure 8:
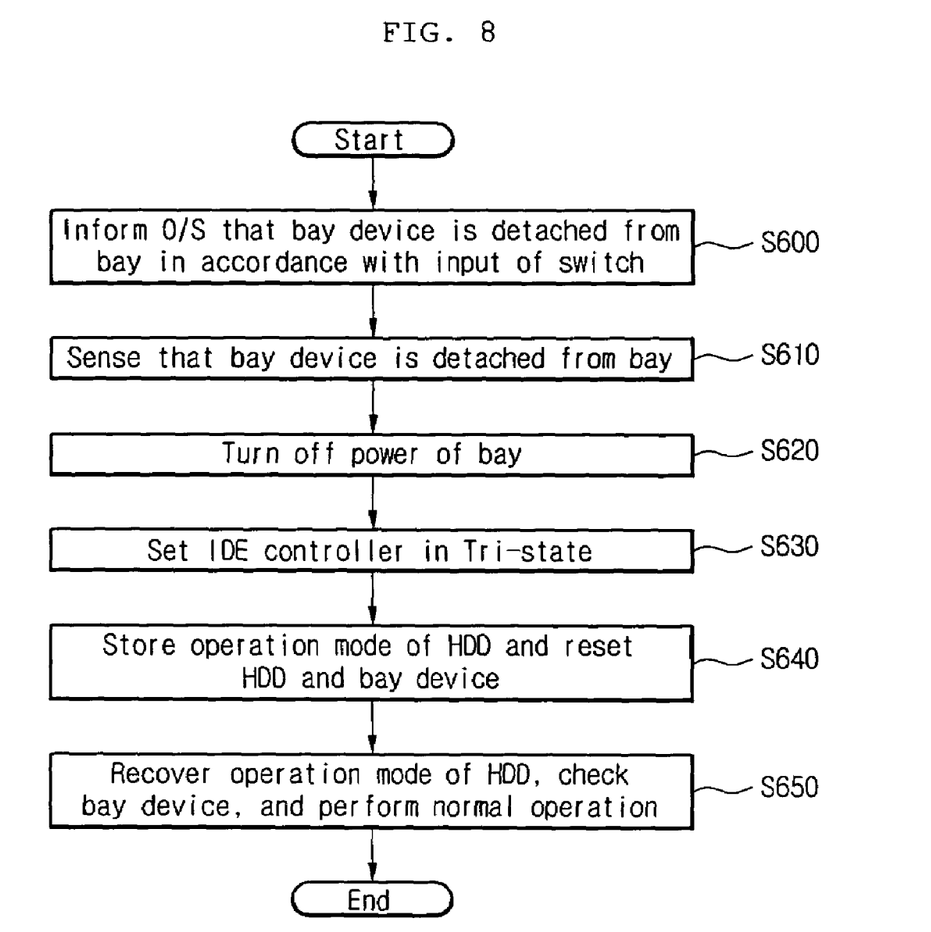
FIG. 8 is a flowchart illustrating an embodiment of a method of controlling the portable computer according to the present invention, which illustrates the case in which the auxiliary memory is detached from the bay.

FIG. 8 is a flowchart illustrating a method of controlling (e.g., detaching a bay device) the portable computer according to the present invention The method of FIG. 8 can be applied to and will be described using the embodiment of portable computer shown in FIG. 4. However, the invention is not intended to be so limited.

As shown in FIG. 8, when a switch for detaching the bay device 45 from the bay is input, the microcomputer 46 can inform the O/S that the bay device 45 will be detached from the bay so that the O/S can sense that the bay device 45 will be detached from the bay (block S600). When the bay device 45 is detached from the bay, the signal BAY_ATTACHED# is in the high state (e.g., prescribed state) so that the microcomputer 46 can sense that the bay device 45 is detached from the bay (block S610).

When the auxiliary memory is detached from the bay, the microcomputer can turn off the power of the bay (block S620). On the other hand, the O/S can set the IDE controller in the tri-state (S630).

Then, the O/S can reset the HDD 44 and the bay device 45 after storing the operation mode of the HDD 44, recover the operation mode of the HDD 44, and check the bay device 45. After checking the bay device 45, the O/S normally operates in accordance with the newly detached bay device 45 (S640 and S650).

Embodiments of methods and apparatus for controlling a portable computer according to the invention were described using an exemplary integrated electronic drive (IDE) channel (e.g., where a bay device can be swapped). However, the invention is not intended to be so limited. For example, embodiments of the invention can be applied to parallel or serial advanced technology attachment (ATA) channels. Further, embodiments can be applied to parallel or serial interfaces including approved open-source or standardized interfaces for connecting storage devices such as hard discs, CD ROMS, and other removable storage devices to a computer. Such interfaces can implement a master/slave configuration to support two devices.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. Furthermore, for ease of understanding, certain method procedures may have been delineated as separate procedures; however, these separately delineated procedures should not be construed as necessarily order dependent in their performance. That is, some procedures may be able to be performed in an alternative ordering, simultaneously, etc.

As described above, methods and apparatus for controlling a portable computer according to the invention have various advantages. For example, according to one method of controlling the portable computer, when the bay device is attached to and detached from the bay, the IDE controller can be set in the tri-state and the operation mode of the HDD can be stored, reset, and recovered so that the bay device can be stably attached to and detached from the bay. Further, according to embodiments of the invention, even when the south bridge supports the single IDE channel, the bay device can be swapped. Specifically, the bay device can be swapped without additional hardware or while power is on to the portable computer and the IDE controller.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A portable computer comprising:
    a single channel controller to support a prescribed channel;
    a main storage device connected to the prescribed channel;
    a modular device to connect to the prescribed channel or to disconnect from the prescribed channel; and
    a controller to initiate a first prescribed operation to place the single channel controller in a predetermined state when the controller detects that the modular device is connected to the prescribed channel or when the controller detects that the modular device is disconnected from the prescribed channel, and
    the main storage device recognizes a presence of the modular device upon connection of the modular device to the prescribed channel within a predetermined time, wherein the main storage device and the modular device are both coupled to the single channel controller via the prescribed channel.

2. The portable computer of claim 1, wherein the prescribed channel is coupled to both a master device and a slave device.

3. The portable computer of claim 1, wherein the prescribed channel is an integrated drive electronics (IDE) channel, and wherein the IDE channel is a serial advanced technology attachment (ATA) channel or a parallel ATA channel.

4. The portable computer of claim 1, wherein the predetermined state is a tri-state, which is a non-operational state or a data transfer suspend state.

5. The portable computer of claim 1, wherein the main storage device is set as a master of the prescribed channel, and wherein the modular device is set as a slave of the prescribed channel.

6. The portable computer of claim 1, wherein the first prescribed operation initiates a second prescribed operation to store the operation mode of the main storage device before connection to the prescribed channel is reset and to recover the operation mode of the main storage device after connection to the prescribed channel is reset.

7. The portable computer of claim 6, wherein the operation mode is a Direct Memory Access (DMA) mode.

8. The portable computer of claim 7, wherein the predetermined time is 30 seconds.

9. The portable computer of claim 1, wherein the controller turns on and off the power to the modular device attached to and detached from a bay.

10. The portable computer of claim 1, wherein the modular device is at least one of an auxiliary memory, a digital multimedia broadcasting (DMB) module, a portable Internet module or a digital TV module, and wherein the main storage device is a hard disk drive (HDD).

11. A method of controlling a portable computer including a primary device and a bay connected to a channel controller through a single channel, the method comprising:
   setting the channel controller in a predetermined state upon a bay device being attached to the bay;
   resetting connection of the primary device and the bay device to the single channel after an operation mode of the primary device is stored;
   recognizing a presence of the bay device connected to the single channel; and
   restoring the operation mode of the primary device after recognizing the presence of the bay device connected to the single channel.

12. The method of claim 11, wherein the primary device comprises a main storage device, and the method further comprises:
   receiving a signal indicating the bay device is attached to the single channel;
   supplying power to the bay device; and
   executing a bay event handler.

13. The method of claim 12, wherein the predetermined state is a state that is neither an OFF state where a channel controller receives a supply voltage of zero volts nor an ON state where the channel controller receives the supply voltage of not less than 3 volts, and wherein in the tri-state the channel controller receives the supply voltage between zero volts and 3 volts.

14. The method of claim 12, wherein the bay device is at least one of an auxiliary memory, a digital multimedia broadcasting (DMB) module, a portable Internet module or a digital TV module.

15. The method of claim 11, wherein the operation mode is a Direct Memory Access (DMA) mode.

16. The method of claim 15, wherein the primary device is set as a master of the channel, and wherein the bay device is set as a slave of the channel.

17. The method of claim 11, wherein the restoring occurs when the primary device and the bay device are both coupled to a same channel controller via the single channel.

18. A method of controlling a portable computer including a primary device and a bay connected to a channel controller through a single channel, the method comprising:
   setting the channel controller in a predetermined state upon a bay device being attached to the bay;
   resetting connection of the primary device and the bay device to the single channel after an operation mode of the primary device is stored;
   recognizing a presence of the bay device connected to the single channel;
   restoring the operation mode of the primary device after recognizing the presence of the bay device connected to the single channel;
   receiving a signal indicating the bay device is detached from the single channel;
   canceling power to the bay device in response to receiving the signal indicating the bay device is detached from the single channel; and
   executing a bay event handler, wherein the executing the bay event handler comprises:
   setting the channel controller into the predetermined state,
   resetting a main storage device and the bay device and thereby the main storage device detects a change in a slave state, and
   verifying the bay device was detached from the bay.

19. The method of claim 18, wherein the predetermined state is a state that is neither an OFF state where the channel controller receives a supply voltage of zero volts nor an ON state where the channel controller receives the supply voltage of less than a prescribed voltage.

* * * * *